June 2, 1931.   F. H. VAN HOUTEN   1,808,696
DOUGH HANDLING APPARATUS
Filed July 31, 1930         2 Sheets-Sheet 1

Inventor
Frank H. Van Houten,
By
His Attorneys

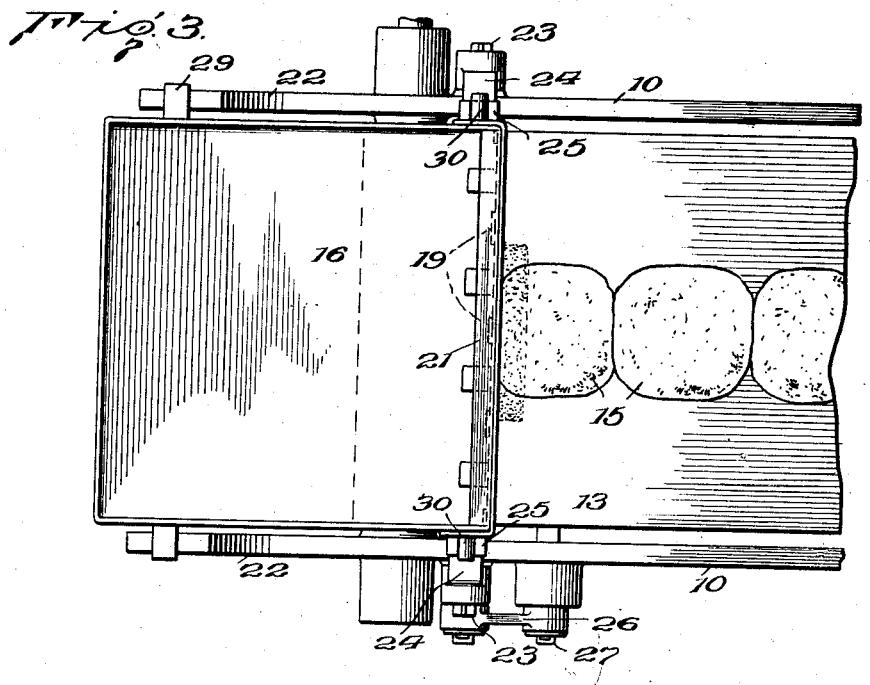
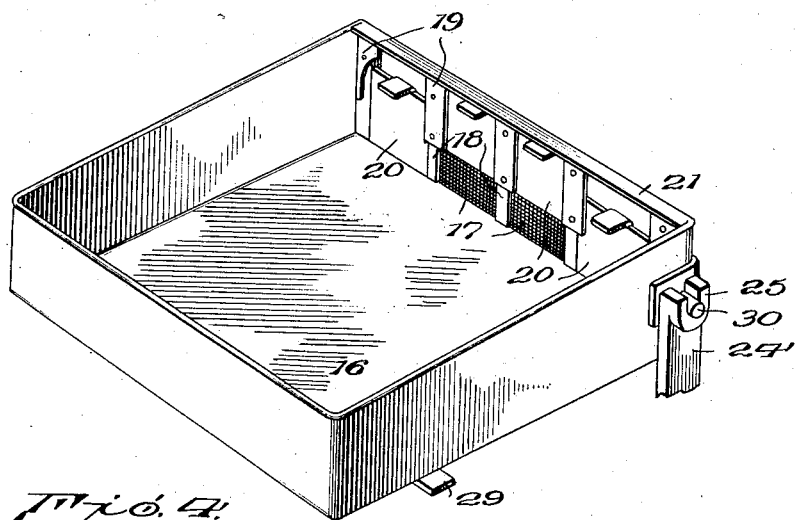

Patented June 2, 1931

1,808,696

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH HANDLING APPARATUS

Application filed July 31, 1930. Serial No. 472,091.

This invention relates to dough handling apparatus and particularly to a mechanical flour sifter for dusting flour over dough while the same is having various mechanical operations performed thereon in bread making.

One object of the invention is to provide a simpler and more practical method of dusting flour as compared with those dusters now in use, wherein there is an agitator inside the bowl or box or other flour receptacle. The commonest objection to sifters where internal agitators are used in the flour receptacle is the accumulation of foreign matter, like nails, lint from bags, strings and sticks, which become entangled with the agitators. Of course, this foreign matter has to be removed and it is difficult, if not impossible, to do so when the agitators are in operation. With the present duster if there is an accumulation of foreign matter in the flour receptacle it is only necessary to lift the receptacle off its support and throw the contents thereof out, after which a new supply of flour may be deposited therein.

More specifically, the invention contemplates a flour sifter composed of a flour receptacle having a perforate wall portion toward which flour in the receptacle is moved, whereby it is dusted through the perforate portion, this movement of the flour toward the perforate portion being effected by a mechanical means connected to the receptacle itself, these connections imparting a vibratory motion to the receptacle. In other words, in lieu of having an agitator within the receptacle, the receptacle itself is actuated or vibrated for the purpose of feeding or dusting the flour through the perforate portion.

A further object is the provision of means for varying or regulating the quantity of flour discharged from the sifter irrespective of the degree to which the flour is agitated by the vibratory motion of the duster.

A still further object is the provision of a duster that may be assembled on and removed from the dough handling apparatus in conjunction with which it is to be used with the greatest ease and in a minimium lapse of time.

With these and other objects in view the invention consists in certain details of construction and combinations and arrangements of parts all as will hereinafter be more fully described and the novel features thereof particularly pointed out in the appended claims.

In the accompanying drawings:

Fig. 3 is a plan view of the same, and

Fig. 4 is a detail perspective view of the duster receptacle.

Figure 1:
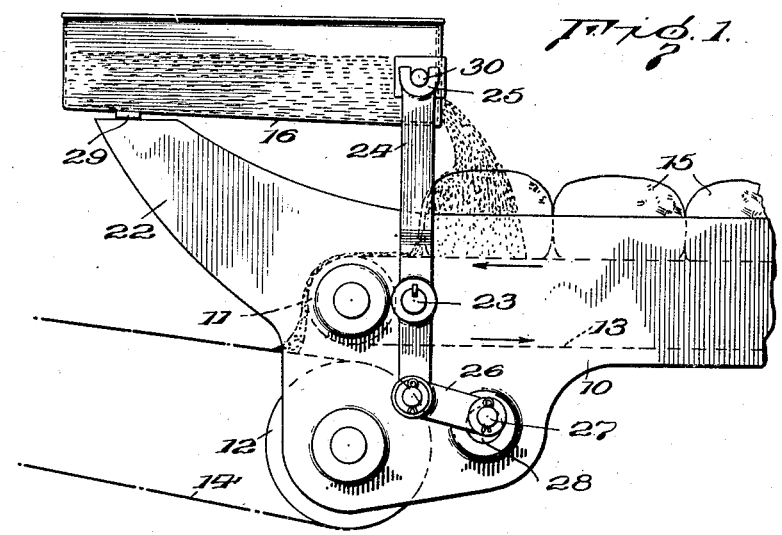
Figure 1 is a side elevational view of the duster, a portion of a pair of feed belts for conveying the lumps of dough being shown.

The duster, as mentioned, is adapted for use in connection with various types of dough handling apparatus and for this reason there is shown in the present instance only a frame 10 in which there are supported rolls 11 and 12 for the traveling belts 13, 14 for transporting the lumps of dough 15 from one machine, for instance a divider, to the next machine in which the lumps will be rounded or formed into loaves.

The sifter itself consists essentially of a receptacle 16 having a foraminous or perforate portion in its surface. Preferably, this foraminous or perforate portion is formed by having one side wall of the receptacle of wire mesh construction. As shown in Fig. 4, what might be termed the front wall of the receptacle is formed of wire mesh, as at 17, there being several sections, in the present instance four, of this wire mesh material separated from one another by an upright piece of metal 18. Attached to these upright portions 18 are plates 19 so that there is formed a plurality of ways in which gates 20 may be slidably secured, these gates being held against accidental upward displacement by means of a flange 21 turned inwardly along this wall of the receptacle. This construction is described as consisting of gates 20 but, if desired, the several gates might be referred to as constituting individual sections of a gate extending substantially the full width of the receptacle as it will be apparent that one integral gate may be used, or in lieu thereof a gate composed of a plurality of sections, as indicated at 20, may be utilized.

Figure 2:
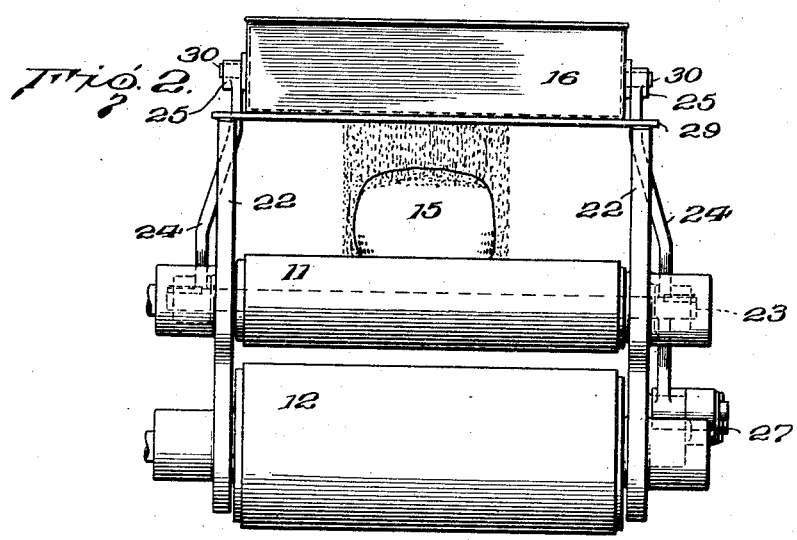
Fig. 2 is an end elevation of the structure shown in Fig. 1.

The primary feature of using a sectional gate, as shown, is that one or more sections may be lowered when desired to regulate the volume of flour discharged through the wire mesh elements 17. For instance, as shown in Figs. 2 and 3, if the lumps of dough on the belt 13 are located solely along the medial portion thereof it would be unnecessary to dust the edge portions of the belt with flour. Under these circumstances the end sections of wire mesh elements 17 could well be rendered inoperative by completely lowering that portion of the gate members that cooperate therewith to cut off or prevent the flow of flour through these sections of wire mesh.

In the particular form of frame illustrated, the duster is mounted thereon by having said frame formed with extensions 22, the ends of said extensions terminating at a point vertically above the upper surface of the lumps of dough 15, and mounted in said frame is a rock shaft 23 having mounted thereon, at opposite sides of the frame, levers or arms 24, whose upper ends are formed with bearings 25. The lever 24 at one side of the frame, as shown in Fig. 1, extends somewhat below shaft 23 and has pivotally attached thereto a connecting rod 26 which is attached to a crank 27 of a shaft 28. As will be apparent, rotation of shaft 28 will cause a rocking motion of arms or levers 24. No source of power for the rotation of shaft 28 is shown but it will be understood that the same is adapted to be driven from some moving element of the drive connections for the machine with which the duster is used, just as is the case with the actuation of the belt 13, which travels in the direction of the arrows in Fig. 1.

Preferably, where the sifter is to be mounted on a frame of the type shown, there is attached to the bottom surface of the sifter near the rear wall, a strap 29 whose end portions project beyond the side walls of the receptacle and rest on the upper extremities of extensions 22. At its forward end the sifter receptacle 16 is formed with trunnions 30 that rest in bearings 25 at the upper ends of arms 24. Therefore, as the arms 24 are rocked during the operation of the machine, the receptacle 16 of the present duster will be vibrated or agitated with more or less of a reciprocatory motion of the strap 29 on extensions 22, with the result that flour within the receptacle will be discharged through the sieve or wire mesh portion 17 onto the belt 13, or onto lumps of dough supported on said belt. With this construction not only is the necessity of an agitator within the receptacle eliminated but the receptacle of the sifter simply rests loosely, so to speak, on its supports above the dough carrying surface. In other words, it can be placed on the frame and removed from the frame with the greatest of ease.

What I claim is:

1. In dough handling apparatus, the combination of a flour receptacle having a foraminous surface therein through which flour in the receptacle may be dusted, a sectional gate, each section of said gate being operable independently of the others to vary the area of said foraminous surface, and means for imparting a vibratory motion to the receptacle.

2. In dough handling apparatus, the combination of a loosely supported flour receptacle having a foraminous surface therein through which flour may be dusted, and means for moving the receptacle on its support to impart a vibratory motion thereto, said means comprising rocker arms engaging said receptacle and constituting a support therefor.

3. In dough handling apparatus, the combination of a flour receptacle having a perforate wall, said receptacle being loosely supported at its opposite ends, and means for moving said receptacle on its support for imparting vibratory motion thereto and dusting flour through said perforate wall, said means forming the support for one end of the receptacle.

4. In dough handling apparatus, the combination of a support, a receptacle movable with respect to said support, said receptacle having a foraminous surface therein, a rotatable shaft, and means between said shaft and receptacle for imparting vibratory motion to the latter, said receptacle being partially supported by said means.

5. In dough handling apparatus, the combination of a support, a receptacle movable with respect to said support, said receptacle having a foraminous surface therein, a rock shaft, arms on said shaft, trunnions on said receptacle supported on said arms, and means for rocking said shaft.

6. In dough handling apparatus, the combination of a frame, a dough supporting surface in said frame, a flour receptacle supported at one end on said frame, said receptacle having a foraminous surface, and means for imparting a vibratory motion to said receptacle to dust flour through said foraminous surface onto said dough supporting surface, said means forming the support for the other end of the receptacle.

FRANK H. VAN HOUTEN.